United States Patent [19]

Delius et al.

[11] Patent Number: 5,773,059
[45] Date of Patent: Jun. 30, 1998

[54] POLYAMIDE-BASED SAUSAGE CASING

[75] Inventors: Ulrich Delius, Frankfurt; Dieter Beissel, Wiesbaden, both of Germany

[73] Assignee: Hoechst Aktiengesellschaft, Frankfurt am Main, Germany

[21] Appl. No.: 588,447

[22] Filed: Jan. 18, 1996

[30] Foreign Application Priority Data

Jan. 21, 1995 [DE] Germany ............... 195 01 834.6

[51] Int. Cl.⁶ ............... A22C 13/00; B29C 55/28
[52] U.S. Cl. ............... 426/129; 264/209.5; 264/210.5; 264/235.8; 264/564; 426/523
[58] Field of Search ............... 426/129, 523; 428/34.8; 138/118.1; 264/209.5, 210.5, 235.8, 564

[56] References Cited

U.S. PATENT DOCUMENTS

| 4,461,808 | 7/1984 | Mollison ............... 428/475.8 |
| 4,560,520 | 12/1985 | Erk et al. ............... 264/458 |
| 4,601,929 | 7/1986 | Erk et al. ............... 428/34.8 |
| 4,659,599 | 4/1987 | Strutzel ............... 428/34.8 |
| 4,944,970 | 7/1990 | Stenger et al. ............... 428/34.8 |
| 5,326,613 | 7/1994 | Stenger ............... 428/34.8 |
| 5,399,427 | 3/1995 | Stenger et al. ............... 428/34.8 |
| 5,480,690 | 1/1996 | Stenger et al. ............... 428/34.8 |

FOREIGN PATENT DOCUMENTS

| 133 867 | 3/1985 | European Pat. Off. . |
| 408 390 | 1/1991 | European Pat. Off. . |
| 450 435 | 10/1991 | European Pat. Off. . |
| 573 306 | 12/1993 | European Pat. Off. . |
| 620 244 | 10/1994 | European Pat. Off. . |
| 43 39 337 | 5/1995 | Germany . |
| 2 035 198 | 6/1980 | United Kingdom . |

*Primary Examiner*—Leo B. Tentoni
*Attorney, Agent, or Firm*—Foley & Lardner

[57] ABSTRACT

A polyamide-based sausage casing of a polymer blend comprising
  a) nylon 6,
  b) 5–50% by weight, based on the total weight of all polymers in the layer, of a
    b1) aliphatic copolyamide containing units of the formulae $-NH-[CH_2]_5-CO-$ and $-NH-[CH_2]_m-CO-$ where m is an integer from 7 to 11, or
    b2) an aliphatic copolyamide containing units of the formulae $-NH-[CH_2]_5-CO-$, $-NH-[CH_2]_n-NH-$ and $-CO-[CH_2]_o-CO-$, where n is an integer from 6 to 12 and o is an integer from 7 to 10, or
    both b(1) and b(2); and
  c) 0–20% by weight of an amorphous copolyamide containing hexamethylenediamine, and at least one of terephthalic acid and isophthalic acid units; and
  d) 0–20% by weight of a polyolefin modified by carboxyl groups.

16 Claims, No Drawings

POLYAMIDE-BASED SAUSAGE CASING

BACKGROUND OF THE INVENTION

1. Field of Invention

The invention relates to a polyamide-based tubular sausage casing which is particularly suitable for cooked-meat sausage and scalded-emulsion.

2. Description of Related Art

There are to date numerous plastic films for packaging foods which can be charged in a pasty or molten state into containers. These films are generally made on the basis of poly(ethylene terephthalate) (PET), poly(vinylidene chloride) (PVDC) and polyamide (PA). However, biaxially stretched PET casings are generally not suitable for cooked-meat sausage or scalded-emulsion sausage, since they can scarcely be extended and can shrink only a little. Although PVDC casings are significantly more extensible, they are more likely to lose their shape after filling. This is particularly marked if the sausages hang for a relatively long period. Polyamide casings are more extensible, shrink to a greater extent and are therefore, generally more suitable for cooked-meat sausage and scalded-emulsion sausage.

DE-A 28 50 182 and GB-A 2 035 198 describe a thermoset, single-layered casing which has been stretched so as to be able to shrink longitudinally and transversely, made of an aliphatic polyamide whose glass transition point in the dry state is at least 48° C. and decreases with moisture absorption to at least 3° C. Those polyamides which have been specifically disclosed are nylon 6 (polycaprolactam), nylon 7 [poly(7-aminoheptanoic lactam) or poly(ω-enantholactam)], nylon 6,6 (polyamide of hexamethylenediamine and adipic acid) and nylon 6,10 [polyamide of hexamethylenediamine and decanedioic acid sebacic acid)].

A similar casing is described in DE-A 28 50 181 and GB-A 2 035 198 comprising a polymer blend which, in addition to an aliphatic polyamide, also contains an ionomer resin, a modified ethylene/vinyl acetate copolymer and/or a quaternary polymer containing units of ethylene, butylene, an aliphatic, ethylenically unsaturated ($C_3$–$C_5$) carboxylic acid and an ester of this carboxylic acid with ($C_1$–$C_8$) alcohols. After an initial cut, the casing shows a decreased tendency for further tearing. If these casings are used for cooked-meat sausage and scalded-emulsion sausage, the sausage meat emulsion must be charged at a pressure of about 0.3 to 0.6 bar in order to stretch the casing.

Since a sausage meat emulsion loses volume after scalding, the casing should compensate for this loss so that it lies against the filling-free of folds. That is, the casing should shrink to the same extent as its contents. However, the known casings are shrinkable only to a limited extent and therefore, are stretched during the stuffing process. The necessary stuffing pressure is quite high and at the limit of what is possible using known sausage stuffing machines. In the case of hand filling, the pressure is so low that such casings would detach from the sausage meat emulsion so that the casing comes off, and would form folds. This gives the sausage the appearance of being unsightly and no longer fresh in the eyes of the consumer.

In DE-A 32 27 945, U.S. Pat. No. 4,560,520 and U.S. Pat. 4,601,929, there is disclosed a single-layered sausage casing and is made of a polyamide which can absorb at least 5% of its weight of water. This single layered casing has a reduced tendency to continue tearing open after initial cutting than the casing known from DE-A 28 50 182. Starting materials for this casing are, in particular, nylon 6 and nylon 6,6.

These casings are produced by extrusion, stretching the extruded tube in the longitudinal and transverse directions and subsequently, subjecting the casing to complete thermosetting under controlled shrinkage. The controlled shrinkage is 15% to about 40% in each direction, generally about 20%. However, in this case as well, the casing must be expanded by elevated pressure during stuffing if it is to remain free of folds later.

The mechanical properties of stretched polyamide casings depend greatly on their water content. A minimum water content is necessary in order to keep the casings sufficiently extensible and supple during the stuffing process. However, the presence of water and steam during scalding processes increases the water content in such a way that the mechanical properties of the casings are adversely affected.

A polyamide-based single-layered casing for cooked-meat sausage and scalded-emulsion sausage which also remains dimensionally stable on scalding is disclosed by EP-A 0 176 980 and U.S. Pat. No. 4,659,599. This casing comprises a mixture of polyamide and polyester. The polyamide is a saturated, linear, aliphatic polyamide, in particular nylon 6, and the polyester is a poly(terephthalic ester) and/or a copolyester with terephthalic acid and isophthalic acid units. Owing to the presence of polyester in the admixture, the casing is relatively opaque and shows an unnatural metallic lustre. In addition, the casing is only slightly extensible and must be stuffed under a relatively high pressure if it is to remain free of folds.

A single-layered, biaxially stretch-oriented and thermoset sausage casing according to DE-A 39 43 024 and U.S. Pat. 5,326,613 is glass-clear, does not have a metallic or mother-of-pearl-like lustrous appearance, and shows high resilience. This casing is produced from a polymer blend comprising polycaprolactam, that is, nylon 6, and an aromatic copolyamide of hexamethylenediamine, terephthalic acid and isophthalic acid units. This casing is also primarily intended for mechanical filling under pressure. It is less suitable for manual filling, because it is usually not supple enough.

EP-A 0 573 306 describes a tubular, multilayered, biaxially stretched, shrinkable sausage casing. The casing contains one layer made of a polymer blend comprising nylon 6 and at least 5% by weight of a copolyamide e.g., nylon 6,12 or nylon 6/69. This layer is enclosed by other layers, specifically polyolefin layers. The polyamide layer is relatively thin in comparison to the polyolefin layers. The food casings specifically disclosed in this patent are all six-layered.

SUMMARY OF THE INVENTION

One object of the present invention is to provide a sausage casing, in particular for cooked-meat sausage and scalded-emulsion sausage. Another object of the present invention is to provide a sausage casing which is suitable not only for mechanical but also for manual filling. In accordance with those objectives, there is provided according to one aspect of the present invention, a polyamide-based sausage casing of a polymer blend comprising a) nylon 6, b) 5–50% by weight, based on the total weight of all polymers in the layer, of a b1) aliphatic copolyamide containing units of the formulae —NH—[$CH_2$]$_5$—CO— and —NH—[$CH_2$]$_m$—CO—, where m is an integer from 7 to 11, or b2) an aliphatic copolyamide containing units of the formulae —NH—[$CH_2$]$_5$—CO—,—NH—[$CH_2$]$_n$—

—NH— and —CO—[CH$_2$]$_o$—CO—, where n is an integer from 6 to 12 and o is an integer from 7 to 10, or both b(1) and b(2)

c) 0–20% by weight of an amorphous copolyamide containing hexamethylenediamine, and at least one of terephthalic acid and isophthalic acid units; and d) 0–20% by weight of a polyolefin modified by carboxyl groups.

In accordance with these objectives, there is also provided according to another aspect of the present invention, a multi-layered sausage casing wherein at least one layer is comprised of the polymer blend set forth above.

In accordance with these objectives, there is additionally provided according to another aspect of the present invention, a process for the production of a sausage casing comprising converting components forming each individual layer of the casing into a homogeneous melt, extruding the melt through a ring die, forming a seamless tube, then stretching the casing in a longitudinal and a transverse direction and thermosetting, wherein at least one layer of the casing comprises a polymer blend set forth above.

In further accordance with these objectives, there is still further provided according to another aspect of the present invention, a method for producing scalded-emulsion sausage and cooked-meat sausage comprising using a sausage casing comprising the above polymer blend.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

The sum of the percentages by weight of the components a) to d) should be equal to 100 if none of the constituents mentioned further below is added. The molar ratio of the units of the formula —NH—[CH$_2$]$_5$—CO— to those of the formula —NH—[CH$_2$]$_m$—CO— in the aliphatic copolyamide b1) is preferably from 95:5 to 20:80, particularly preferably from 60:40 to 30:70. The molar ratio of the units of the formula —NH—[CH$_2$]$_5$—CO— to the total number of units of both of the formulae —NH—[CH$_2$]$_n$—NH— and —CO—[CH$_2$]$_o$—CO— in the aliphatic co-polyamides b2) is preferably from 95:5 to 25:75, particularly preferably from 70:30 to 30:70. The units of the formulae —NH—[CH$_2$]$_n$n—NH— and —CO—[CH$_2$]$_o$—CO— are preferably present in virtually equimolar amounts.

In the aliphatic copolyamides b1), m is preferably 7 or 11. For example, the units of the formula —NH—[CH$_2$]$_m$—CO— are preferably those of 8-amino-octanoic acid (8-amino-caprylic acid) or 12-aminododecanoic acid (12-amino-lauric acid).

In the aliphatic copolyamides b2), n is preferably 6 and o is preferably 7, 8 or 10. For example, the units of the formula —NH—[CH$_2$]$_n$—NH— are preferably those of hexane-1,6-diyldiamine (hexamethylenediamine) and the units of the formula —CO—[CH$_2$]$_o$—CO— are preferably those of nonanedioic acid (azelaic acid), decanedioic acid (sebacic acid) or dodecanedioic acid. The copolyamide of hexamethylenediamine and azelaic acid is generally referred to as nylon 69 (or nylon 6,9). A copolymer of hexamethylenediamine and sebacic acid is also known as nylon 610 or nylon 6,10 and a copolymer of hexamethylenediamine and dodecanedioic acid is known as nylon 612 or nylon 6,12. The copolyamide containing units of e-caprolactam, hexamethylenediamine and azelaic acid is termed nylon 6/69.

Either copolyamide b1) or b2) may be employed. Alternately, b1) and b2) may both be employed. In any event, the total proportion of b1) and b2) is preferably 10–30% by weight based on the total weight of all polymers in the layer. It should be noted that casings which contain the component b2) tend to show particularly high transparency.

The amorphous and partially aromatic component c) of hexamethylenediamine, and at least one of terphthalic acid and isophthalic acid units is optional and is preferably included in an amount to assist in decreasing the permeability of the casing to oxygen and water, preferably from 0–20% by weight, most preferably 5–15% by weight, based on the total weight of all polymers in the layer. The component c) is rendered partially aromatic due to the terephthalic acid and isophthalic acid units. Copolyamides containing hexamethylenediamine and terephthalic acid or isophthalic acid units are also known as nylon 6-T or nylon 6-I, respectively.

The polyolefin d) modified by carboxyl groups is optional, but is preferably included in an amount from 0–20% by weight. The component d), if employed, is preferably a copolymer containing units of ethylene and (meth)acrylic acid. (Meth)acrylic acid in this case means acrylic acid and methacrylic acid. The (meth)acrylic acid units are preferably employed in a proportion to assist in decreasing the permeability of the casing to oxygen and water, preferably from 2–25% by weight. The proportion of the component d) is most preferably included in an amount from 5–15% by weight, again based on the total weight of the polymers in the layer. In particular, as noted above, the components c) and d) act to assist in decreasing the permeability of the casing to oxygen and water vapor.

The novel sausage casing may further contain colorants, pigments and/or processing aids. The proportion of these constituents may be relatively low, so that the essential properties of the sausage casing are not substantially affected thereby.

In a particularly preferred embodiment, the novel sausage casing contains 40–80% by weight of the component a), 10–30% by weight of the component b) and 5–15% by weight each of the components c) and d). The optimum ratio of the components also depends on, inter alia, the diameter of the sausage casing, its wall thickness and the type of application.

The novel sausage casing, in comparison with a casing made of pure nylon 6, generally exhibits significantly higher suppleness and an improved "feel", in particular in the soaked state. The casing encloses the scalded sausages significantly more tightly after cooling than has been demonstrated previously. In addition, the shrinkage stress, measured in the transverse direction in the dry state at 100° C. is decreased with respect to conventional casings.

According to the invention, there is also included a process for the production of a single- or multi-layered sausage casing. In the process, the components which each individual layer of the casing are converted into a homogeneous melt. In the case of a single-layered casing, all the components are converted into the melt. The melt is extruded through a ring die and is formed into a seamless tube which is then stretched in the longitudinal and transverse directions. The process comprises producing at least one layer from the abovementioned polymer blend of components a), b), and optionally c) and/or d). Mixing and melting can be performed in a separate mixing extruder. Multilayered casings are in general produced by coextruding the homogeneous melts forming the individual layers through specifically designed annular coextrusion dies. The homogeneous melts forming the individual layers are fed to the coextrusion die separately. Thus, for a three-layered casing, three different extruders are usually connected with the coextrusion die. The seamless tubular film produced by extrusion is generally stretched in the longitudinal and transverse directions by the pressure of a gas, usually air, charged into the interior and by applying a tensile stress in the longitudinal direction, for example, by a pair of rollers. This process is known as "blow molding" and is generally known to those skilled in the art. Due to the stretching, the casing generally achieves a significantly, higher strength. In order to decrease the shrinkage occurring under the action of heat, the tubular film may be partially set by an additional heat treatment such as by thermosetting. The finished sausage casing generally shows a shrinkage of 5–25% in the longitudinal and transverse directions in water at 80° C. The thickness of the stretched and thermoset sausage casing is generally 10 to 50 $\mu$m, preferably 25 to 45 $\mu$m. The process is likewise part of the present invention.

For specific applications, the novel sausage casing can also be multi-layered. A feature of the multi-layered casing is that it contains at least one layer made of the above-specified polymer blend of components a), b), and optionally c) and/or d). The other layers preferably comprise polyamides such as nylon 6, polyamide blends, polyolefins such as polyethylene or polypropylene, and also polyolefins which have been provided with functional groups giving adhesion, copolymers containing units of ethylenically unsaturated monomers such as vinyl acetate, vinyl alcohol, acrylic and methacrylic acid, and vinylidene chloride or acrylonitrile copolymers, ionomer resins or mixtures of the abovementioned polymers.

It is also preferred that the casing be biaxially stretch-oriented and thermoset. The strength of the casing should not decrease during scalding to the extent that it bursts or begins to tear. Scalding generally occurs in practice at a temperature of about 80° C. On cooling, the casing should shrink with the contents without coming off or preferably without even forming folds. At the same time, by employing a casing which shrinks with the content, sausage jelly is likely prevented from collecting under the casing. In addition, the casing should have sufficient tension that the sausage makes a firm and fresh impression. It should also be sufficiently supple and have a soft feel so that the casing is also suitable for manual sausage filling, which is accomplished at a pressure lower than in mechanical stuffing. A metal clip conventionally used to close the sausage ends should sit on the casing to the extent possible, in a non-slip manner. That is, the casing preferably has a high friction with respect to metal. The casing should have a relatively low permeability to water vapor and oxygen in order to minimize weight loss during storage and to prevent decay by oxidation. In appearance, the casing should be as transparent as possible and have an attractive luster, since sausages in an opaque or milky casing are not well appreciated by the consumer. Finally, the casing should be relatively easy to manufacture from inexpensive raw materials.

The novel multilayered casing usually comprises 2 to 5 layers. Preferably, the layer made of the specified polymer blend is followed in alternation by other layers comprising one or more polyolefins and/or one or more polyamides. Such a casing may be produced by coextrusion using ring dies which are specially constructed in accordance with the number of layers. The use of such ring dies may require a higher expenditure on equipment.

The single- or multi-layered sausage casing can then be printed, shirred in sections to form so-called "concertinas" or cut into relatively small pieces tied off at one end. The short pieces tied off at one end may be used in manual production of sausage.

In the following examples, pbw means parts by weight.

EXAMPLE 1

A mixture of 80 pbw of nylon 6 (the relative viscosity of a 1% strength solution of the polyamide in 96% strength sulfuric acid at 20° C. is 4)

10 pbw of nylon 6/69 (®Grilon CF62BS from Ems-Chemie AG) (melt volume index: 40 ml in 10 min at 190° C. and 10 kg load) and 10 pbw of ethylene/methacrylic acid copolymer (®Nucrel 0903 HC from DuPont de Nemours Inc.) (melt flow index: 2.5 g in 10 min at 190° C. and 2.16 kg load)

was plasticated to a homogeneous melt in a single-screw extruder at 240° C. and extruded through a ring die to give a tube of 18 mm diameter. The polymer tube was firstly rapidly cooled, then heated to the temperature necessary for stretching, stretched by the blow-molding process and finally thermoset, the stretching ratio in the longitudinal and transverse directions remaining unchanged. The area stretching ratio was 9.6. The tube had a diameter of 66 mm.

EXAMPLE 2

A mixture of 70 pbw of nylon 6 (as in Example 1), 10 pbw of nylon 6/69 (as in Example 1), 10 pbw of amorphous nylon 6-I/6-T (®Selar PA 3426 from DuPont de Nemours Inc.) (melt flow index: 90 g in 10 min at 275° C. and a load of 10 kg) and 10 pbw of ethylene/methacrylic acid copolymer (as in Example 1)

was processed as described in Example 1 to give a stretched and thermoset sausage casing. The casing dimensions were likewise identical.

EXAMPLE 3

A mixture of 60 pbw of nylon 6 (as in Example 1), 20 pbw of nylon 6/69 (as in Example 1), 10 pbw of amorphous nylon 6-I/6-T (as in Example 2) and 10 pbw of ethylene/methacrylic acid copolymer (as in Example 1)

was processed as described to give a biaxially stretched and thermoset sausage casing. The dimensions of the product were also identical in this case.

EXAMPLE 4

A mixture of 50 pbw of nylon 6 (as in Example 1), 30 pbw of nylon 6/69 (as in Example 1), 10 pbw of amorphous nylon 6-I/6-T (as in Example 2) and 10 pbw of ethylene/methacrylic acid copolymer (as in Example 1)

was processed as described to give a biaxially stretched and thermoset sausage casing. The area stretching ratio was again 9.6 and the diameter of the finished sausage casing was 66 mm.

EXAMPLE 5

A mixture of
- 65 pbw of nylon 6 (as in Example 1),
- 15 pbw of nylon 612 (®Grilon CF6S from Ems-Chemie AG) (melt flow index: 50 g in 10 min at 190° C. and a load of 10 kg),
- 10 pbw of amorphous nylon 6-I/6-T (as in Example 2) and
- 10 pbw of ethylene/methacrylic acid copolymer (as in Example 1)

was processed as described to give a biaxially stretched and thermoset sausage casing. The area stretching ratio was 9.2 and the diameter of the finished sausage casing was 63 mm.

EXAMPLE 6

A mixture of
- 50 pbw of nylon 6 (as in Example 1),
- 30 pbw of nylon 612 (as in Example 5),
- 10 pbw of amorphous nylon 6-I/6-T (as in Example 2) and
- 10 pbw of ethylene/methacrylic acid copolymer (as in Example 1)

was processed as described to give a biaxially stretched and thermoset sausage casing. The area stretching ratio was likewise 9.2 and the diameter of the finished sausage casing was 63 mm.

EXAMPLE 7

To produce a multi-layered sausage casing, the following polymer mixtures are used:

Mixture A:
- 80 pbw of nylon 6 (as in Example 1),
- 10 pbw of amorphous nylon 6-I/6-T (as in Example 2) and
- 10 pbw of nylon 6/6,9 (as in Example 1)

Mixture B:
- 70 pbw of low-density polyethylene (®Lupolen 1441D from BASF AG) having a melt flow index of 0.2 g in 10 mm at 190° C. and 2.16 kg load and
- 30 pbw of a linear low density polyethylene (LLDPE) which is modified by maleic anhydride to give adhesion to polyamide (®Escor CTR 2000 from Exxon) having a melt flow index of 3 g in 10 mm at 190° C. and 2.16 kg load Mixture C:
- 85 pbw of nylon 6 (as in Example 1),
- 15 pbw of amorphous nylon 6-I/6-T (as in Example 2)

These mixtures were plasticated to give homogeneous melts in three single-screw extruders, each at 240° C, then combined in a three-layer ring die and coextruded to form a tube of 18 mm in diameter. This tube was processed as described to give a biaxially stretched and thermoset sausage casing. The area stretching ratio was 9.6 and the diameter of the finished sausage casing was 66 mm. At a total film thickness of 55 µm, the layers had the following thicknesses:

Outer layer (mixture A): 30 µm.
Central layer (mixture B): 20 µm
Inner layer (mixture C): 5 µm

Comparison Example 1

The pure nylon 6 from Example 1 was processed as described there to give a sausage casing. The area stretching ratio was 9.0.

Comparison Example 2

A mixture of
- 80 pbw of nylon 6 (as in Example 1),
- 10 pbw of amorphous nylon 6-I/6-T (as in Example 2) and
- 10 pbw of ethylene/methacrylic acid copolymer (as in Example 1) was processed in accordance with Example 1 to give a stretched and thermoset sausage casing. The stretching ratio was 9.0 and the diameter of the finished sausage casing was 61 mm.

Comparison Example 3

A single-layered sausage casing according to DE-C 28 50 181 having a nominal diameter of 60 mm (®Betan from Naturin-Werke Becker & Co.) was similarly processed and measured.

Comparison Example 4

A single-layered sausage casing according to DE-C 28 50 182 having a nominal diameter of 60 mm (®Optan from Naturin-Werke Becker & Co.) was similarly processed and measured.

The measurements in the table below verify the superiority of the novel casings of the present invention in comparison to the known art.

Explanation of footnotes:

1) The tearing stress was measured as specified in DIN 53455 on strips of 15 mm in width and a clamped length of 50 mm soaked for 30 min.
2) Here, the percentage increase was determined in the outer circumference of tube sections which had been soaked in advance for 30 min and then inflated to achieve the specified internal pressure.
3) The casing was impinged on one side by air having a relative humidity (R.H.) of 85% at 20° C. The water vapor permeability was measured as specified in DIN 53122.
4) The $O_2$ permeability was measured as specified in DIN 53380 at 53% R.H. and 23° C.
5) A casing soaked for 30 min was evaluated subjectively. The figures given have the following meaning: 1=extremely soft, 2=very soft, 3=soft and 4=medium.
6) Change in dimensions after storage in water at 80° C. for 15 min.
7) The shrinkage stress was measured on dry strips of 15 mm in width which were clamped for 3 min at 100° C. and 0% R.H. between two measuring clamps spaced 100 mm apart. This spacing remained unchanged.
8) The casing was filled by hand at a constant stuffing pressure with fine-grained scalded-emulsion sausage meat and closed with metal clips. The sausages were then cooked in a scalding cabinet at 78° C. and 100° R.H. for 60 min. After cooling to 7° C., they were evaluated for appearance and consistency.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

| Example No. | Film Thickness μm | Tearing Stress 1) N/mm² longitudinal | Tearing Stress 1) transverse | Transverse Elongation 2) in % at 25 kPa | Transverse Elongation 2) 50 kPa | Water Vapor Permeability 3) g/m²·day | $O_2$ Permeability 4) cm³/m²·day·bar | Flexibility 5) | Shrinkage 6) transverse in % | Shrinkage Stress 7) transverse N/mm² | Result of Stuffing Test 8) |
|---|---|---|---|---|---|---|---|---|---|---|---|
| 1 | 35 | 168 | 59 | 8.5 | 18.5 | 12.0 | 16.9 | 2 | 25 | 9.4 | free of folds-firm |
| 2 | 37 | 125 | 41 | 9.5 | 19.0 | 11.5 | 13.6 | 2 | 26 | 10.2 | free of folds-very firm |
| 3 | 36 | 131 | 52 | 10.5 | 21.0 | 13.1 | 16.5 | 1 | 26 | 8.5 | free of folds-firm |
| 4 | 33 | 124 | 53 | 13.0 | 24.0 | 12.1 | 18.5 | 1 | 24 | 5.6 | free of folds-firm |
| 5 | 35 | 122 | 38 | 10.0 | 20.0 | 11.6 | 14.1 | 2 | 26 | 10.4 | free of folds-firm |
| 6 | 36 | 114 | 35 | 12.5 | 23.0 | — | — | 2 | 25 | 7.3 | free of folds-firm |
| 7 | 55 | 118 | 42 | 8.0 | 18.5 | 3.1 | 14.0 | 2 | 23 | 7.1 | free of folds-very firm |
| V1 | 35 | 186 | 68 | 8.0 | 18.0 | 26.3 | 18.1 | 3 | 24 | 10.2 | with folds |
| V2 | 37 | 130 | 41 | 6.5 | 15.0 | 12.2 | 14.0 | 4 | 26 | 11.0 | sith slight folds |
| V3 | 40 | 150 | 180 | 7.5 | 12.8 | 16.0 | 17.0 | 4 | 12 | — | with folds |
| V4 | 50 | 200 | 200 | 4.0 | 9.5 | 25.0 | — | 4 stiff | 3 | — | with folds |

What is claimed is:

1. A polyamide-based sausage casing of a polymer blend comprising
   a) nylon 6,
   b) 5–50% by weight, based on the total weight of all polymers in the layer, of a
      b1) aliphatic copolyamide containing units of the formulae —NH—[CH₂]₅—CO— and —NH—[CH₂]$_m$—CO— where m is an integer from 7 to 11, or
      b2) an aliphatic copolyamide containing units of the formulae —NH—[CH₂]₅—CO—, —NH—[CH₂]$_n$—NH— and —CO—[CH₂]$_o$—CO—, where n is an integer from 6 to 12 and o is an integer from 7 to 10, or
      both b(1) and b(2); and
   c) 0–20% by weight of an amorphous copolyamide containing hexamethylenediamine, and at least one of terephthalic acid and isophthalic acid units; and
   d) 0–20% by weight of a polyolefin modified by carboxyl groups,
   wherein a+b+c>50% by weight, based on the total weight of all polymers in the layer.

2. A sausage casing as claimed in claim 1, wherein the molar ratio of the units of the formula —NH—[CH₂]₅—CO— to the units of the formula —NH—[CH₂]$_m$—CO— in the aliphatic copolyamnide b1) is from 95:5 to 20:80.

3. A sausage casing as claimed in claim 2, wherein the molar ratio of the units of the formula —NH—[CH₂]₅—CO— to the units of the formula —NH—[CH₂]$_m$—CO— in the aliphatic copolyamide b1)is from 60:40 to 30:70.

4. A sausage casing as claimed in claim 1, wherein the molar ratio of the units of the formula —NH—[CH₂]₅—CO— to the total number of units of both formulae —NH—[CH₂]$_n$—NH— and —CO—[CH₂]$_o$—CO— in the aliphatic copolyamide b2) is from 95:5 to 25:75.

5. A sausage casing as claimed in claim 4, wherein the molar ratio of the units of the formula —NH—[CH₂]₅—CO— to the total number of units of both formulae —NH—[CH₂]$_n$—NH— and —CO—[CH₂]$_o$—CO— in the aliphatic copolyamide b2)is from 70:30 to 30:70.

6. A sausage casing as claimed in claim 1, wherein, m is 7 or 11.

7. A sausage casing as claimed in claim 1, wherein, n is 6 and o is 7, 8 or 10.

8. A sausage casing of a polymer blend comprising
   a) nylon 6,
   b) 5–50% by weight, based on the total weight of all polymers in the layer, of a
      b1) aliphatic copolyamides containing units of the formulae —NH—[CH₂]₅—CO— and —NH—[CH₂]$_m$—CO— where m is an integer from 7 to 11, or
      b2) an aliphatic copolyamide containing units of the formulae —NH—[CH₂]₅—CO—, —NH—[CH₂]$_n$—NH— and —CO—[CH₂]$_o$—CO—, where n is an integer from 6 to 12 and o is an integer from 7 to 10, or
      both b(1;) and b(2); and
   c) 0–20% by weight of an amorphous copolyamide containing hexamethylenediamine, and at least one of terephthalic acid and isophthalic acid units; and
   d) 0–20% by weight of a polyolefin modified by carboxyl groups, wherein the proportion of the component b) is 10–30% by weight, that of the component c) is 5–15% by weight, and that of the component d) is 5–15% by weight, in each case based on the total weight of all polymers in the layer.

9. A sausage casing as claimed in claim 1, wherein the polyolefin d) modified by carboxyl groups is a copolymer containing units of ethylene and (meth)acrylic acid.

10. A sausage casing as claimed in claim 1, wherein said sausage casing is single-layered.

11. A sausage casing as claimed in claim 10, wherein said sausage casing is biaxially stretch-oriented and thermoset.

12. A polyamide-based multi-layer sausage casing, wherein said multi-layered sausage comprises at least one layer of a polymer blend according to claim 1.

13. A multi-layered sausage casing as claimed in claim 12, wherein the at least one layer is provided in said casing in alternation with layers of polyolefin or polyamide, or both polyolefin and polyamide.

14. A process for the production of a sausage casing as claimed in claim 1, said process comprising converting components forming each individual layer of the casing into a homogeneous melt, extruding the homogeneous melt through a ring die, forming a seamless tube, then stretching the casing in a longitudinal and transverse directions and thermosetting.

15. A method for producing scalded-emulsion sausage and cooked-meat sausage comprising using a sausage casing according to claim 1.

16. A polyamide-based single-layered sausage casing of a polymer blend comprising:

a) nylon 6, b) 5–50% by weight, based on the total weight of all polymers in the layer, of a b1) aliphatic copolyamide containing units of the formulae —NH—[CH$_2$]$_5$—CO— and —NH—[CH$_2$]$_m$—CO— where m is an integer from 7 to 11, or b2) an aliphatic copolyamide containing units of the formulae —NH—[CH$_2$]$_5$—CO—, —NH—[CH$_2$]$_n$—NH— and —CO—[CH$_2$]$_o$—CO—, where n is an integer from 6 to 12 and o is an integer from 7 to 10, or both b(1) and b(2); and c) 0–20% by weight of an amorphous copolyamide containing hexamethylenediamine, and at least one of terephthalic acid and isophthalic acid units; and d) 0–20% by weight of a polyolefin modified by carboxyl groups.

wherein a+b+c>50% by weight, based on the total weight of all polymers in the layer.

* * * * *